US012151708B2

(12) United States Patent
Grelaud et al.

(10) Patent No.: US 12,151,708 B2
(45) Date of Patent: Nov. 26, 2024

(54) METHOD AND DEVICE FOR SELECTING THE TARGET OBJECT FOR AN AUTOMATIC DISTANCE CONTROL OF A SINGLE-TRACK MOTOR VEHICLE

(71) Applicant: Robert Bosch GmbH, Stuttgart (DE)

(72) Inventors: Mathieu Grelaud, Ludwigsburg (DE); Michael Schoenherr, Renningen-Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 516 days.

(21) Appl. No.: 17/417,343

(22) PCT Filed: Nov. 7, 2019

(86) PCT No.: PCT/EP2019/080473
§ 371 (c)(1),
(2) Date: Jun. 22, 2021

(87) PCT Pub. No.: WO2020/143942
PCT Pub. Date: Jul. 16, 2020

(65) Prior Publication Data
US 2022/0073071 A1 Mar. 10, 2022

(30) Foreign Application Priority Data
Jan. 10, 2019 (DE) .......................... 102019200209.9

(51) Int. Cl.
*B60W 60/00* (2020.01)
(52) U.S. Cl.
CPC ........ *B60W 60/0011* (2020.02); *B60W 60/00* (2020.02); *B60W 60/001* (2020.02)

(58) Field of Classification Search
CPC . B60W 60/00; B60W 60/001; B60W 60/0011
See application file for complete search history.

(56) References Cited

U.S. PATENT DOCUMENTS

2019/0139415 A1* 5/2019 Sakaguchi ............ B60W 30/10
2022/0227392 A1* 7/2022 Ishimaru ........... B60W 30/0956

FOREIGN PATENT DOCUMENTS

DE 10207580 A1 9/2003
DE 102017205506 A1 10/2018
(Continued)

OTHER PUBLICATIONS

Commonwealth of Virginia, Department of Motor Vehicles, Virginia Motorcycle Operator Manual, Jul. 1, 2016, Virginia Department of Motor Vehicles, pp. 3-28. (Year: 2016).*
(Continued)

*Primary Examiner* — Khoi H Tran
*Assistant Examiner* — Aaron G Cain
(74) *Attorney, Agent, or Firm* — NORTON ROSE FULBRIGHT US LLP; Gerard A. Messina

(57) ABSTRACT

A method for selecting the target object for an automatic distance control of a single-track motor vehicle. The presence of a second single-track motor vehicle preceding directly in the same lane and a third single-track motor vehicle preceding directly the second single-track motor vehicle are detected with the aid of a surroundings sensor system. The lateral offset of the second single-track motor vehicle and of the third single-track motor vehicle are ascertained with regard to the single-track motor vehicle. The target object being selected for the method for distance control as a function of at least one of the lateral offsets.

5 Claims, 1 Drawing Sheet

(56) References Cited

FOREIGN PATENT DOCUMENTS

| EP | 3335955 A1 | * | 6/2018 | ............ B60T 8/1706 |
| JP | 2016034819 A | | 3/2016 | |
| WO | 2005092659 A1 | | 10/2005 | |

OTHER PUBLICATIONS

International Search Report for PCT/EP2019/080473, Issued Feb. 19, 2020.

* cited by examiner

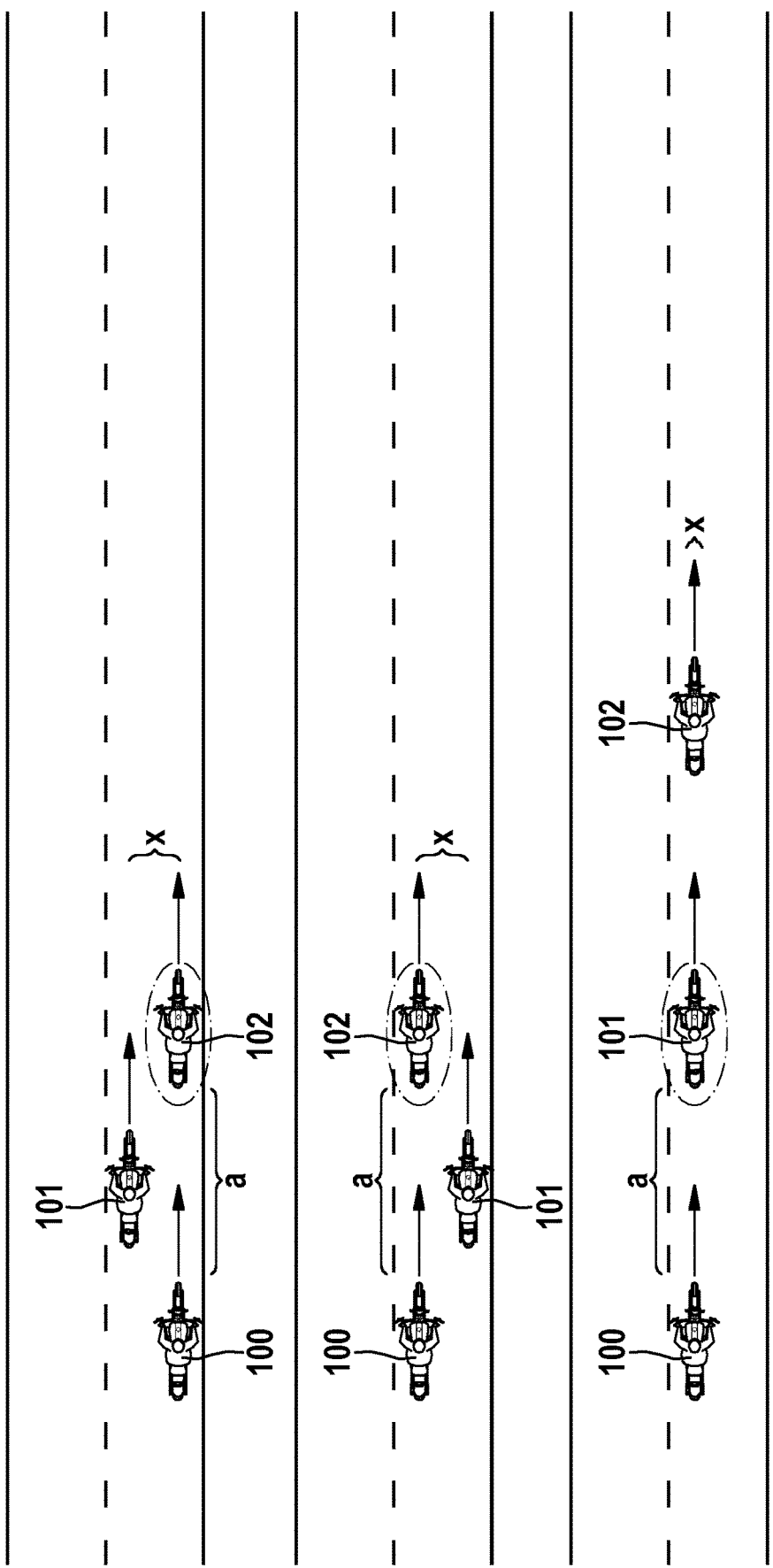

METHOD AND DEVICE FOR SELECTING THE TARGET OBJECT FOR AN AUTOMATIC DISTANCE CONTROL OF A SINGLE-TRACK MOTOR VEHICLE

BACKGROUND INFORMATION

German Patent Application No. DE 10 2017 205 506 A1 describes a method for distance control for a single-track motor vehicle that follows a directly preceding motor vehicle that is also single-track
  in which the longitudinal distance from the single-track motor vehicle to the preceding motor vehicle is ascertained,
  in which the lateral offset between the single-track motor vehicle and the preceding motor vehicle is ascertained,
  a setpoint distance between the single-track motor vehicle and the preceding motor vehicle is ascertained as a function of the lateral offset, and
  the longitudinal distance is approximated to the setpoint distance by varying the braking torque or the drive torque of the single-track motor vehicle independently of the driver.

SUMMARY

The present invention relates to a method for selecting the target object for an automatic distance control of a single-track motor vehicle,
  in which the presence of a second single-track motor vehicle preceding directly in the same lane and a third single-track motor vehicle directly preceding the second single-track motor vehicle are detected with the aid of a surroundings sensor system,
  the lateral offset of the second single-track motor vehicle and of the third single-track motor vehicle being ascertained with regard to the single-track motor vehicle and
  the target object being selected for the method for distance control as a function of at least one of the lateral offsets.

As a result, a comfortable automatic distance control is made possible for single-track motor vehicles, in particular when driving in a group. By detecting two preceding vehicles, a near parallel drive with regard to a considerably offset preceding motor vehicle may be made possible in appropriate situations and the distance control may be oriented toward a further vehicle driving in front of the two parallel vehicles. In the case of the distance control, the distance to a preceding vehicle, which is referred to as a target object, is adjusted to a predefined value. This predefined value may also be a function of variables, such as the instantaneous speed, for example.

In one advantageous example embodiment of the present invention, in the event that the lateral offset of the second single-track motor vehicle falls below a predefined first threshold value, the second single-track motor vehicle is selected as the target object. In this case, the distance control refers to the preceding vehicle, similarly to the passenger car range.

In one advantageous embodiment of the present invention, in the event that the lateral offset of the second single-track motor vehicle exceeds a predefined second threshold value and the lateral offset of the third single-track motor vehicle falls below a predefined third threshold value, the third single-track motor vehicle is selected as the target object.

In one advantageous example embodiment of the present invention, the first threshold value and the second threshold value are identical.

In one advantageous embodiment of the present invention, the first threshold value and the second threshold value and the third threshold value are identical.

In one advantageous example embodiment of the present invention, the target object is that particular preceding single-track motor vehicle, to which the distance of the single-track motor vehicle is controlled.

In one advantageous example embodiment of the present invention, the distance control takes place with the aid of a braking intervention or engine torque intervention that is independent of the driver.

Furthermore, the present invention includes a device, including elements which are configured to carry out the method according to the present invention. This involves, in particular, a control unit, in which the program code for carrying out the method according to the present invention is stored.

BRIEF DESCRIPTION OF THE DRAWINGS

FIG. 1 shows in three illustrations a group of three motorcycles in each case which move from left to right, each in top view.

DETAILED DESCRIPTION OF EXAMPLE EMBODIMENTS

The present invention deals with a distance control for a powered two-wheeler that moves in particular in a group of other powered two-wheelers. In the following elucidations, the present invention is described for the specific case of motorcycles, the present invention naturally also being applicable to other powered two-wheelers.

In this case, a motorcycle is contemplated that moves in a group of motorcycles, as this is the case when driving in a group, for example. The motorcycle is not located at the very front or in the second position within the driving group, but it assumes the third position or drives even further in the back.

In contrast to passenger car drivers, motorcyclists often drive laterally or laterally offset from one another, especially when driving in a group. A front vehicle driving in a considerably offset manner does not need to be taken into account for a motorcycle in the case of an automatic distance control, since there is no risk of a rear-end collision accident due to the lateral offset. This is why a distance control that is comfortable for the driver may be based on detecting the position of the two most closely preceding vehicles and, as a function thereof, those two vehicles are selected to which the longitudinal distance is intended to be automatically adjusted.

FIG. 1 shows in a top view from top to bottom three driving situations, in which a motorcycle 100 follows two preceding motorcycles 101 and 102. All three vehicles drive from right to left in the right-hand lane of the road illustrated in the top view. Motorcycle 100 drives in this case using an automatic distance control, 101 is the directly preceding motorcycle, 102 is the foremost vehicle of the group of the three motorcycles.

In the top illustration of FIG. 1, motorcycle 100 drives at the right-hand edge of the right-hand lane and its surroundings sensor system detects the two preceding motorcycles 101 and 102.

Motorcycle 101 has a considerable lateral offset x with regard to motorcycle 100, so that there is no risk of a rear-end collision. For this reason, first motorcycle 102 of the group is selected as the target object by the distance control system and distance a is adjusted. The target object is surrounded by a dashed ellipse in the two bottom illustrations for highlighting purposes.

In the central illustration, motorcycle 100 moves at the left-hand edge of the right-hand lane. Since here, too, a considerable lateral offset x is present with regard to preceding motorcycle 101, first motorcycle 102 of the group is again selected as the target object and distance a is adjusted.

In the bottom illustration, all three motorcycles 100, 101 and 102 move almost in line, one behind the other. Lateral offset x of motorcycle 101 with regard to motorcycle 100 is very minor, so that 101 is selected as the target object and for this purpose, distance a is adjusted.

What is claimed is:

1. A method for an automatic distance control of a first single-track motor vehicle to a setpoint distance from a target object, the method comprising the following steps continually performed during a drive of the first single-track motor vehicle:
    detecting, in a lane in which the first single-track motor vehicle is traveling in a travel direction, a presence of a second single-track motor vehicle and a third single-track motor vehicle traveling in the travel direction, wherein, with respect to the travel direction, (a) a rear of the first single-track motor vehicle is behind respective rears of both the second single-track motor vehicle and the third single-track motor vehicle and (b) the rear of the second single-track motor vehicle is behind the rear of the third single-track motor vehicle, the detecting being performed using a surroundings sensor system; and
    performing, by a processor system that is communicatively coupled to the surroundings sensor system, the following:
        (I) ascertaining respective lateral offsets of the second single-track motor vehicle and of the third single-track motor vehicle with regard to the first single-track motor vehicle;
        (II) selecting one of the second single-track motor vehicle and the third single-track motor vehicle as the target object for the automatic distance control of the first single-track motor vehicle to the setpoint distance as a function of the ascertained respective lateral offsets, wherein the selecting is performed by executing an algorithm by which:
            (i) the third single-track motor vehicle is selected as the target object, by which the automatic distance control of the first single-track motor vehicle is dependent on a distance from the third single-track motor vehicle, only if and whenever there is satisfaction of two conditions (a)-(b) that:
                (a) the respective lateral offset of the third single-track motor vehicle is below a threshold distance different than the setpoint distance; and
                (b) the respective lateral offset of the second single-track motor vehicle is not below the threshold distance; and
            (ii) the second single-track motor vehicle is selected as the target object, by which the automatic distance control of the first single-track motor vehicle is dependent on a distance from the single-track motor vehicle, only if and whenever either of the two conditions is not satisfied, so that when the respective lateral offsets of the second and third single-track motor vehicles are both not below the threshold distance, the second single-track motor vehicle is selected as the target object; and
        (III) performing at least one of an automatic drive operation and an automatic brake operation of the first single-track motor vehicle based on a position of the target object that has been selected in the selecting step.

2. The method as recited in claim 1, wherein the automatic drive operation is performed by executing an engine torque intervention that is independent of the driver.

3. A device including a control unit communicatively coupled to a surroundings sensor system and to at least one of a drive system of a first single-track motor vehicle and a braking system of the first single-track motor vehicle, wherein, for an automatic distance control of the first single-track motor vehicle to a setpoint distance from a target object, the control unit is configured to perform the following continually during a drive of the first single-track motor vehicle:
    (I) detect, in a lane in which the first single-track motor vehicle is traveling in a travel direction, a presence of a second single-track motor vehicle and a third single-track motor vehicle traveling in the travel direction, wherein, with respect to the travel direction, (a) a rear of the first single-track motor vehicle is behind respective rears of both the second single-track motor vehicle and the third single-track motor vehicle and (b) the rear of the second single-track motor vehicle is behind the rear of the third single-track motor vehicle, the detecting being performed using the surroundings sensor system;
    (II) ascertain respective lateral offsets of the second single-track motor vehicle and of the third single-track motor vehicle with regard to the first single-track motor vehicle;
    (III) select one of the second single-track motor vehicle and the third single-track motor vehicle as the target object for the automatic distance control of the first single-track motor vehicle to the setpoint distance as a function of the ascertained respective lateral offsets, the selection being performed so that:
        (i) the third single-track motor vehicle is selected as the target object, by which the automatic distance control of the first single-track motor vehicle is dependent on a distance from the third single-track motor vehicle, only if and whenever there is satisfaction of two conditions (a)-(b) that:
            (a) the respective lateral offset of the third single-track motor vehicle is below a threshold distance different than the setpoint distance; and
            (b) the respective lateral offset of the second single-track motor vehicle is not below the threshold distance; and
        (ii) the second single-track motor vehicle is selected as the target object, by which the automatic distance control of the first single-track motor vehicle is dependent on a distance from the single-track motor vehicle, only if and whenever either of the two conditions is not satisfied, so that when the respective lateral offsets of the second and third single-track motor vehicles are both not below the threshold distance, the second single-track motor vehicle is selected as the target object; and
    (IV) perform at least one of an automatic drive operation and an automatic brake operation of the first single-track motor vehicle by operating the at least one of the drive system and the braking system based on a position of the target object that has been selected according to the selection.

4. A method for an automatic distance control of a first single-track motor vehicle to a setpoint distance from a target object, the method comprising the following steps continually performed during a drive of the first single-track motor vehicle:

detecting, a lane in which the first single-track motor vehicle is traveling in a travel direction, a presence of a second single-track motor vehicle and a third single-track motor vehicle traveling in the travel direction, wherein, with respect to the travel direction, (a) a rear of the first single-track motor vehicle is behind respective rears of both the second single-track motor vehicle and the third single-track motor vehicle and (b) the rear of the second single-track motor vehicle is behind the rear of the third single-track motor vehicle, the detecting being performed using a surroundings sensor system;

performing, by a processor system that is communicatively coupled to the surroundings sensor system, the following:

(I) ascertaining respective lateral offsets of the second single-track motor vehicle and of the third single-track motor vehicle with regard to the first single-track motor vehicle;

(II) selecting one of the second single-track motor vehicle and the third single-track motor vehicle as the target object for the automatic distance control of the first single-track motor vehicle to the setpoint distance as a function of the ascertained respective lateral offsets, wherein the selecting is performed so that:

(i) the third single-track motor vehicle is selected as the target object, by which the automatic distance control of the first single-track motor vehicle is dependent on a distance from the third single-track motor vehicle, only if and whenever there is satisfaction of two conditions (a)-(b) that:

(a) the respective lateral offset of the third single-track motor vehicle is below a first threshold distance different than the setpoint distance; and (b) the respective lateral offset of the second single-track motor vehicle is not below a second threshold distance different than the setpoint distance; and (ii) the second single-track motor vehicle is selected as the target object, by which the automatic distance control of the first single-track motor vehicle is dependent on a distance from the single-track motor vehicle, only if and whenever either of the two conditions is not satisfied, so that when the respective lateral offset of the third single-track motor vehicle is not below the first threshold distance and the respective lateral offset of the second single-track motor vehicle is not below the second threshold distance, the second single-track motor vehicle is selected as the target object; and III performing at least one of an automatic drive operation and an automatic brake operation of the first single-track motor vehicle based on a position of the target object that has been selected in the selecting step.

5. The method as recited in claim 1, wherein the automatic brake operation is performed.

* * * * *